United States Patent
Suzuki

(10) Patent No.: US 6,843,975 B1
(45) Date of Patent: Jan. 18, 2005

(54) OXIDE SINTERED BODY AND MANUFACTURING METHOD THEREOF

(75) Inventor: Ryo Suzuki, Ibaraki (JP)

(73) Assignee: Nikko Materials Company, Limited, Tokyo (JP)

( * ) Notice: Subject to any disclaimer, the term of this patent is extended or adjusted under 35 U.S.C. 154(b) by 352 days.

(21) Appl. No.: 10/130,238

(22) PCT Filed: Sep. 17, 2001

(86) PCT No.: PCT/JP01/08044

§ 371 (c)(1),
(2), (4) Date: May 15, 2002

(87) PCT Pub. No.: WO02/051769

PCT Pub. Date: Jul. 4, 2002

(30) Foreign Application Priority Data

Dec. 26, 2000 (JP) ........................................ 2000-394263

(51) Int. Cl.[7] ......................... C01G 55/00; C01F 11/00; B29C 67/00
(52) U.S. Cl. .................................. 423/594.16; 264/125
(58) Field of Search ...................... 423/594.16; 264/125

(56) References Cited

U.S. PATENT DOCUMENTS 5,624,542 A * 4/1997 Shen et al. .................. 204/283
5,995,359 A * 11/1999 Klee et al. .................. 361/305
6,555,864 B1 * 4/2003 Cross et al. ................. 257/310

FOREIGN PATENT DOCUMENTS

JP 10-330924 12/1998
JP 2000-001774 1/2000
JP 2000-128638 5/2000

OTHER PUBLICATIONS

Machine translation of the specification of Japan 2000–128638, May 2000.*
Patent Abstracts of Japan, one page English language Abstract for JP 2000–128638, May 2000.
Patent Abstracts of Japan, one page English language Abstract for JP 2000–001774, Jan. 2000.
Patent Abstracts of Japan, one page English language Abstract for JP 10–330924, Dec. 1998.

* cited by examiner

Primary Examiner—Steven Bos
(74) Attorney, Agent, or Firm—Howson and Howson

(57) ABSTRACT

The present invention relates to an oxide sintered body having a perovskite structure represented with a chemical formula of $MRuO_3$ (M: one or more types among Ca, Sr, Ba), characterized in that the total content of alkali metals such as Na, K, and Fe, Ni, Co, Cr, Cu, Al is 100 ppm or less, the content of respective elements U, Th is 10 ppb or less, and the relative density is 90% or more, and provides an oxide sintered body and the manufacturing method thereof having a pervoskite structure represented with the chemical formula $MRuO_3$ (M: one or more types among Ca, Sr, Ba) by using a $MRuO_3$ sintered body raw material refined to a high density of 4N or more, which enables sintering at low temperatures, and which is capable of obtaining a high-density sintered body.

4 Claims, No Drawings

US 6,843,975 B1

OXIDE SINTERED BODY AND MANUFACTURING METHOD THEREOF

TECHNICAL FIELD

The present invention relates to a high-purity and high-density Ru oxide sintered body and the manufacturing method thereof suitable for sputtering targets having a purity of 4 N or more and a relative density of 90% or more, and particularly to a Ru oxide sintered body and the manufacturing method thereof extremely superior in forming a thin film excellent in uniformity and having minimal formation of particles as the sputtering target upon forming an electrode material for a high dielectric or ferroelectric thin film memory.

BACKGROUND OF THE INVENTION

Today, ferroelectric thin films of BST and PZT as memory material of DRAMs, FRAMs and so on are being actively developed, and major concerns in such dielectric thin films are the fatigue characteristics and data-retention characteristics of the film.

Generally, with respect to a dielectric memory material, a platinum electrode is used as the electrode material of the ferroelectric thin film provided on the $SiO_2$ on the substrate. Nevertheless, with this platinum electrode, due to its own catalytic effect, there are problems of hydrogen deterioration of ferroelectric thin films caused by hydrogen processing during the device process and fatigue deterioration resulting from the localization of oxygen deficiency toward the electrode side, and there is a problem in that the aforementioned characteristics cannot be sufficiently acquired.

Thus, as a substitute for such platinum electrode, there is growing interest in a Ru oxide sintered body. Electrode material obtainable from such Ru oxide sintered body (e.g., $SrRuO_3$) has the potential of becoming a superior electrode material with bulk resistivity of $10^{-5}\Omega\cdot m$ or less.

However, the Ru oxide sintered body; that is, an oxide having a perovskite structure represented with a chemical formula of $MRuO_3$ (M: one or more types among Ca, Sr, Ba), is difficult to sinter, and the density obtainable with an ordinary pressureless sintering method is 70% or less.

Generally, sputtering is performed to a Ru oxide sintered body target to form a thin film. Nevertheless, when machine processing this type of low-density $MRuO_3$ sintered body into a target, the yield becomes extremely inferior and the formation of particles upon sputtering with this target increases considerably. Thus, the formation of favorable thin films cannot be realized.

Therefore, even if the characteristics as an electrode material are superior, there is a major problem in that the uniformity and surface morphology of the film will become inferior when used as a thin film electrode.

Thus, although the sintering conditions are being devised with the perspective of high densification of the $MRuO_3$, the current status is that a sufficient density is yet to be achieved. For example, although the pressure sintering method is effective in high densification, when using a graphite die generally employed in hot pressing, the intended $MRuO_3$ sintered body cannot be obtained due to the reduction of $MRuO_3$ caused by the reaction between the die and $MRuO_3$. Moreover, there is another problem in that the consumption of the die is severe.

Meanwhile, in order to guarantee the operational performance as a reliable semiconductor, it is important to reduce as much as possible the impurities, which are detrimental to the semiconductor devices, in the aforementioned materials formed after sputtering.

In other words,
(1) Alkali metals such as Na, K;
(2) Radioactive elements such as U, Th; and
(3) Class elements of transition metals such as Fe, Ni, Co, Cr, Cu, Al should be reduced as much as possible, and it is desirable that the purity be 4 N; that is, 99.99% (mass) or more. As used herein, every %, ppm and ppb represents mass %, mass ppm and mass ppb, respectively.

Alkali metals such as Na, K, which are the aforementioned impurities, cause the deterioration of MOS-LSI surface characteristics since they easily move within the gate insulation film, radioactive elements such as U. Th cause the soft error of devices with the á ray emitted by such elements, and class elements of transition metals such as Fe, Ni, Co, Cr, Cu, Al contained as impurities are known to cause trouble in interface bonding.

OBJECTS OF THE INVENTION

The present invention seeks to reduce as much as possible harmful substances and to improve the sintering method, and to provide an oxide sintered body and the manufacturing method thereof having a perovskite structure represented with the chemical formula $MRuO_3$ (M: one or more types among Ca, Sr, Ba) by using a $MRuO_3$ sintered body raw material refined to a high density of 4 N or more, which enables sintering at low temperatures, and which is capable of obtaining a high-density sintered body.

SUMMARY OF THE INVENTION

The present invention provides:
1. An oxide sintered body having a perovskite structure represented with a chemical formula of $MRuO_3$ (M: one or more types among Ca, Sr, Ba), characterized in that the total content of alkali metals such as Na, K, and Fe, Ni, Co, Cr, Cu, Al is 100 ppm or less, the content of respective elements U, Th is 10 ppb or less, and the relative density is 90% or more;
2. An oxide sintered body according to paragraph 1 above, characterized in that the relative density is 95% or more;
3. A manufacturing method of an oxide sintered body characterized in conducting pressure sintering using a die covered with $Si_3N_4$, Ru, Pt, Ir, Co, Ni, or an oxide ceramic such as $Al_2O_3$ or $ZrO_2$ upon pressure sintering oxide powder having a perovskite structure represented with a chemical formula of $MRuO_3$ (M: one or more types among Ca, Sr, Ba), characterized in that the total content of alkali metals such as Na, K, and Fe, Ni, Co, Cr, Cu, Al is 100 ppm or less, the content of respective elements U, Th is 10 ppb or less, and the relative density is 90% or more;
4. A manufacturing method of an oxide sintered body according to paragraph 3 above, characterized in that the relative density is 95% or more;
5. A manufacturing method of an oxide sintered body according to paragraph 3 or paragraph 4 above, characterized in that the sintering is conducted at a sintering temperature of 1200 to 1400° C.; and
6. A manufacturing method of an oxide sintered body according to each of paragraphs 3 to 5 above, characterized in that the pressure sintering is conducted with a hot press at a pressurization of 200 kg/cm² or more.

DETAILED DESCRIPTION OF THE PREFERRED EMBODIMENTS

In order to manufacture oxide powder having a perovskite structure represented with a chemical formula of $MRuO_3$ (M: one or more types among Ca, Sr, Ba), SrCO$_3$ powder, CaCO$_3$ powder, BaCO$_3$ powder and RuO$_2$ powder refined to a high purity of 4 N or more are used.

For the high purification of these powders, for example, a recrystallization method from a nitric saline solution in the case of SrCO$_3$ powder, CaCO$_3$ powder and BaCO$_3$ powder, and a vapor phase refining method in the case of RuO$_2$ powder are employed. Pursuant to this high purification, it is possible to achieve a state where the total content of alkali metals such as Na, K, and Fe, Ni, Co, Cr, Cu, Al is 100 ppm or less, and the content of each element of the radioactive elements such as U, Th is 10 ppb or less.

Upon sintering, it is desirable to use a hot press and to conduct sintering at a sintering temperature of 1200 to 1400° C. Here, larger the specific surface area of the oxide powder, lower the temperature may be for sintering, and it is possible to obtain a high-density sintered body equivalent to a case of conducting sintering at a high temperature upon suppressing the reaction with die.

Further, in order to suppress the reaction between the graphite die used in sintering at high temperatures and the MRuO$_3$, sintering is conducted by using a die covered with Si$_3$N$_4$, Ru, Pt, Ir, Co, Ni, or an oxide ceramic such as Al$_2$O$_3$, or ZrO$_2$.

This sintering condition is important. Conventionally, there was no choice but to conduct sintering at a temperature of 1000° C. or less in order to suppress the reaction between the aforementioned graphite die and MRuO$_3$. Therefore, there were cases where the target would crack during the mechanical processing or sputtering thereof since sufficient density could not be achieved, and the yield was significantly decreased thereby. With the improvement of the aforementioned sintering process, however, it was possible to achieve a relative density of 90% or more, and even 95% or more, and the transverse rupture strength was significantly increased thereby.

As a result, cracks are not generated during the mechanical processing of the target or during the handling thereof, and the yield is improved considerably. In addition, the thin film after sputtering is superior in uniformity, and it was possible to obtain a thin film having extremely superior characteristics as an electrode material for a dielectric thin film memory.

EXAMPLES AND COMPARATIVE EXAMPLES

Next, the present invention is described based on the Examples. The Examples are for facilitating the understanding of the invention, and the present invention is not in any way limited thereby. In other words, the present invention covers other Examples and modifications based on the technical spirit of the invention.

Example 1

SrRuO$_3$ single-phase powder was obtained by using SrCO$_3$ powder and RuO$_2$ powder refined to a high purity of 4 N or more and check-weighing and wet blending such powders to achieve Sr:Ru=1:1 (molar ratio), and thereafter conducting thermal synthesis at 900° C. for 10 hours in the atmosphere.

Next, using graphite die in which the obtained SrRuO$_3$ single-phase powder was covered with partially stabilized zirconia, hot press sintering was conducted at 300 kg/cm$^2$ and retained for 2 hours in an argon gas atmosphere at the respective temperatures of 1200° C., 1300° C. and 1400° C.

As a result, although a slight reduction layer could be acknowledged in the vicinity of the surface of the obtained sintered body, obtained was a sintered body free from the generation of fractures and cracks. The relative densities of the above, as shown in the following Table 1, are all 90% or more, and the strength nearly quadrupled in comparison to the transverse rupture strength of 76 kg/cm$^2$ of a sintered body having a relative density of 58% prepared with pressureless sintering at 1400° C.

Further, the bulk resistivity measured with the four probe method was 300 $\mu\Omega$cm or less, and was more than 100 $\mu\Omega$cm less than the one prepared with the pressureless sintering method.

Example 2

The characteristics of the sintered body prepared under the same conditions as Example 1 other than that the hot press condition was set to 1400° C., 200 kg/cm$^2$ were such that, as also shown in Table 1, the relative density was 91% and the resistivity was 277 kg/cm$^2$, whereby obtained was a favorable sintered body.

Example 3

CaRuO$_3$ single-phase powder was obtained by using CaCO$_3$ powder and RuO$_2$ powder refined to a high purity of 4 N or more and check-weighing and wet blending such powders to achieve Ca:Ru=1:1 (molar ratio), and thereafter conducting thermal synthesis at 800° C. for 10 hours in the atmosphere.

Next, using graphite die in which the obtained CaRuO$_3$ single-phase powder was covered with partially stabilized zirconia, hot press sintering was conducted at 300 kg/cm$^2$ and retained for 2 hours in an argon gas atmosphere at a temperature of 1400° C.

Also as shown in Table 1, the relative density of the obtained sintered body was 97%, and the transverse rupture strength and the resistivity were both favorable.

Example 4

BaRuO$_3$ single-phase powder was obtained by using BaCO$_3$ powder and RuO$_2$ powder refined to a high purity of 4 N or more and check-weighing and wet blending such powders to achieve Ba:Ru=1:1 (molar ratio), and thereafter conducting thermal synthesis at 1050° C. for 10 hours in the atmosphere.

Next, using graphite die in which the obtained BaRuO$_3$ single-phase powder was covered with partially stabilized zirconia, hot press sintering was conducted at 300 kg/cm$^2$ and retained for 2 hours in an argon gas atmosphere at a temperature of 1400° C.

Also as shown in Table 1, the relative density of the obtained sintered body was 93%, and the transverse rupture strength and the resistivity were both favorable.

Comparative Example 1

After forming the SrCO$_3$ powder synthesized under the same conditions as Example 1 at 1500 kg/cm$^2$, pressureless sintering was conducted at 1400° C. for 10 hours in the atmosphere. This is outside the scope of the sintering pressure of the present invention.

The relative density of the obtained sintered body was 58%, and the sintering hardly progressed. Moreover, as shown in Table 1, the transverse rupture strength was also low at 76 kg/cm$^2$, and was insufficient in enduring the target processing.

Comparative Example 2

Hot press sintering was conducted to the SrRuO$_3$ powder synthesized under the same conditions as Example 1 at 300 kg/cm$^2$ and retained for 2 hours in an argon gas atmosphere at temperatures of 1000° C. and 1100° C. These sintering temperatures are outside the scope of the sintering temperature of the present invention.

As shown in Table 1, the relative density of the obtained sintered body was less than 80%, and the transverse rupture strength was less than ½ of the sintered body obtained in Example 1.

Comparative Example 3

Hot press sintering was conducted to the SrRuO₃ powder synthesized under the same conditions as Example 1 at 100 kg/Cm² and retained for 2 hours in an argon gas atmosphere at a temperature of 1400° C. This sintering pressure is outside the scope of the present invention. As shown in Table 1, the relative density of the obtained sintered body was 80%, and the transverse rupture strength was approximately ½ of the sintered body obtained in Example 1.

TABLE 1

List of Sintering Conditions and Sintered Body Characteristics of Examples and Comparative Examples

| | Sintering Temperature (° C.) | Sintering Pressure (kg/cm²) | Relative Density | Transverse Rupture Strength (kg/cm²) | Resistivity ($\mu\Omega$cm) | Judgment |
|---|---|---|---|---|---|---|
| Example 1 | 1200 | 300 | 92 | 300 | 300 | ○ |
| | 1300 | 300 | 94 | 305 | 255 | ○ |
| | 1400 | 300 | 96 | 300 | 260 | ○ |
| Example 2 | 1400 | 200 | 91 | 277 | 310 | ○ |
| Example 3 | 1400 | 300 | 97 | 350 | 330 | ○ |
| Example 4 | 1400 | 300 | 93 | 290 | 260 | ○ |
| Comparative Example 1 | 1400 | 0 | 58 | 76 | 460 | X |
| Comparative Example 2 | 1000 | 300 | 62 | 80 | 420 | X |
| | 1100 | 300 | 78 | 150 | 380 | X |
| Comparative Example 3 | 1400 | 100 | 80 | 155 | 330 | X |

The symbol ○ represents a sintered body having favorable relative density, transverse rupture strength and resistivity, whereas X represents a sintered body in which the aforementioned items are unfavorable.

The high-purity and high-density Ru oxide sintered body of the present invention has significant characteristics in that it has a purity of 4 N or more, a relative density of 90% or more, and a high transverse rupture strength. The present invention has a superior effect in that it is able to obtain a Ru oxide sintered body which does not generate cracks or the like during machine processing to the sputtering target, which improves the yield, and which is suitable in manufacturing such target.

What is claimed is:

1. A method of manufacturing an oxide sintered body, comprising the steps of:

covering a die with oxide ceramic, $Al_2O_3$, $ZrO_2$, $Si_3N_4$, Ru, Pt, Ir, Co or Ni; and pressure sintering an oxide powder in said die at a sintering temperature of 1200° C. to 1400° C. to form an oxide sintered body having a perovskite structure represented with a chemical formula of $MRuO_3$, wherein M represents at least one of Ca, Sr and Ba, and wherein a total content of alkali metals including Na, X, and Fe, Ni, Co, Cr, Cu, Al is 100 ppm or less, and a content of elements U and Th is 10 ppb or less, and wherein said oxide sintered body is has a relative density of 90% or more.

2. A method according to claim 1, wherein said pressure sintering step is conducted with a hot press at a pressurization of 200 kg/cm² or more.

3. A mod according to claim 1, wherein said relative density is 95% or more.

4. A method according to claim 3, wherein said pressure sintering step is conducted with a hot press at a pressurization of 200 kg/cm² or more.

* * * * *

UNITED STATES PATENT AND TRADEMARK OFFICE
CERTIFICATE OF CORRECTION

PATENT NO. : 6,843,975 B1
DATED : January 18, 2005
INVENTOR(S) : Ryo Suzuki

It is certified that error appears in the above-identified patent and that said Letters Patent is hereby corrected as shown below:

Column 6,
Line 25 "X, and Fe," should read -- K, and Fe, --
Line 27, "body is has a" should read -- body has a --
Line 32, "A mod according to" should read -- A method according to --.

Signed and Sealed this

Third Day of May, 2005

JON W. DUDAS
*Director of the United States Patent and Trademark Office*